Figure 1:
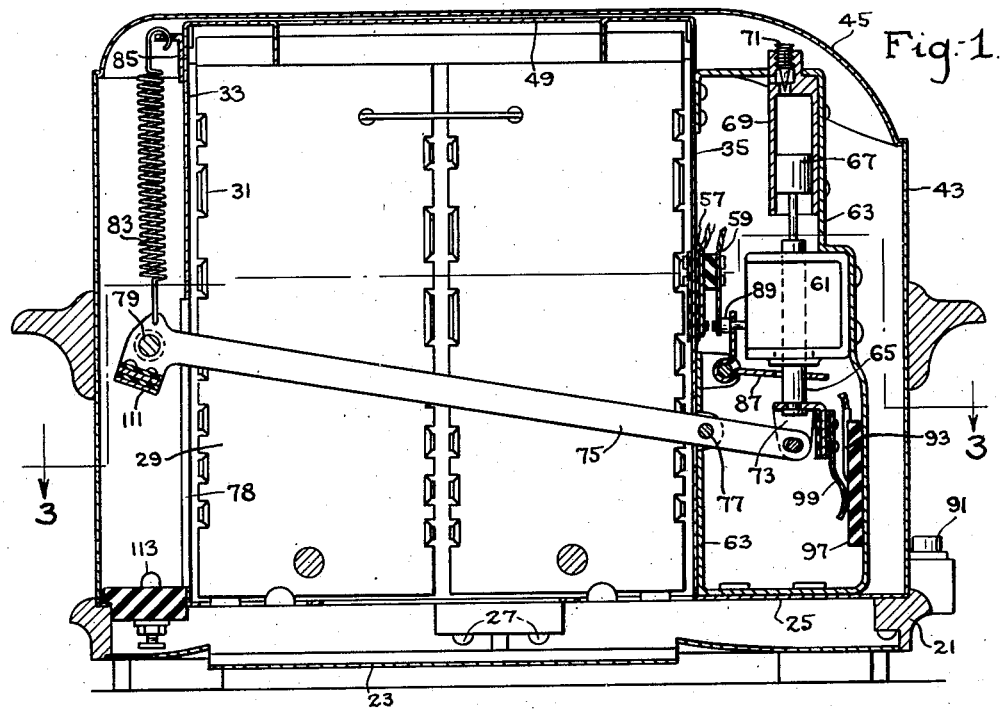

Dec. 16, 1941.   H. M. BIEBEL   2,266,301
AUTOMATIC TOASTER
Filed June 29, 1938   4 Sheets-Sheet 1

Inventor:
Herman M. Biebel
By H. M. Biebel
Attorney.

Dec. 16, 1941.         H. M. BIEBEL         2,266,301
AUTOMATIC TOASTER
Filed June 29, 1938         4 Sheets-Sheet 2
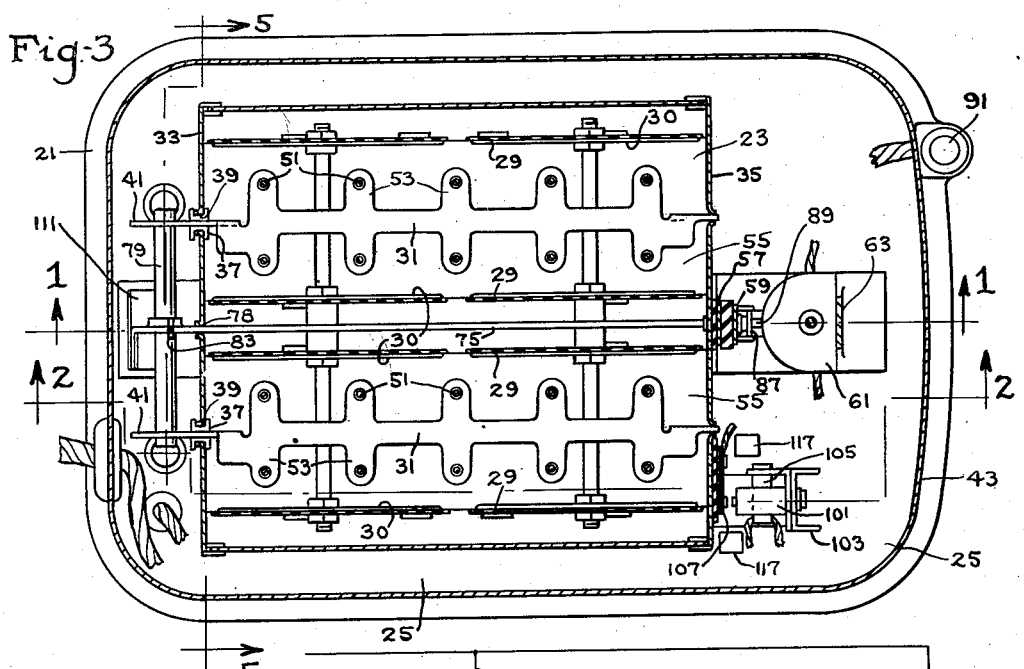
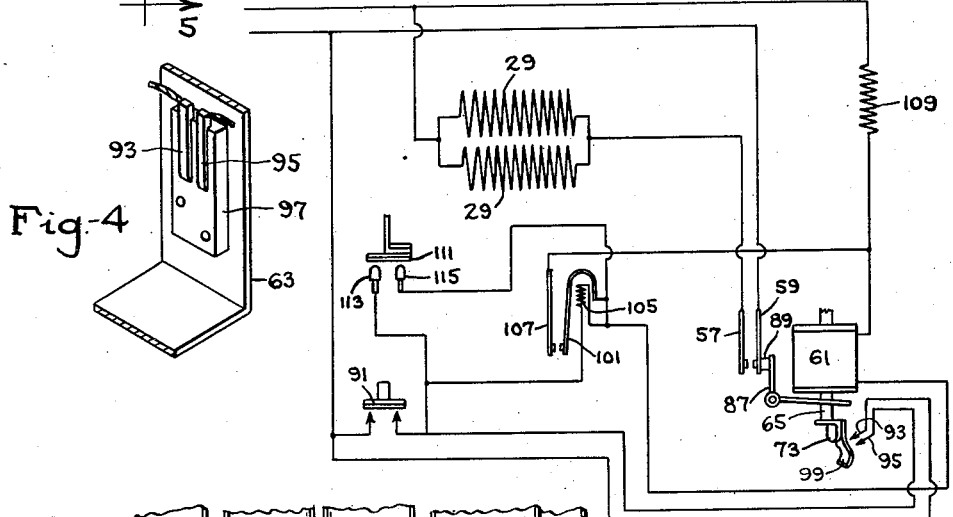
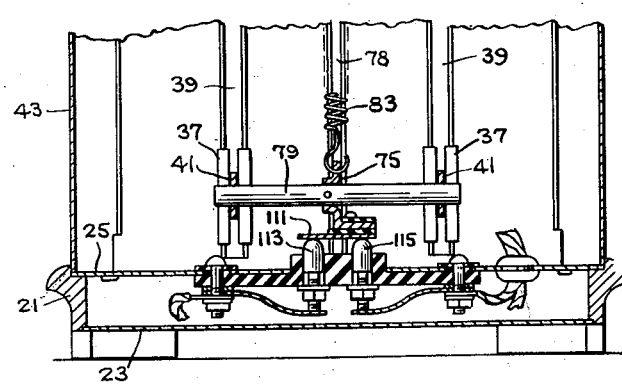
Inventor:
Herman M. Biebel.
By H. M. Biebel
Attorney.

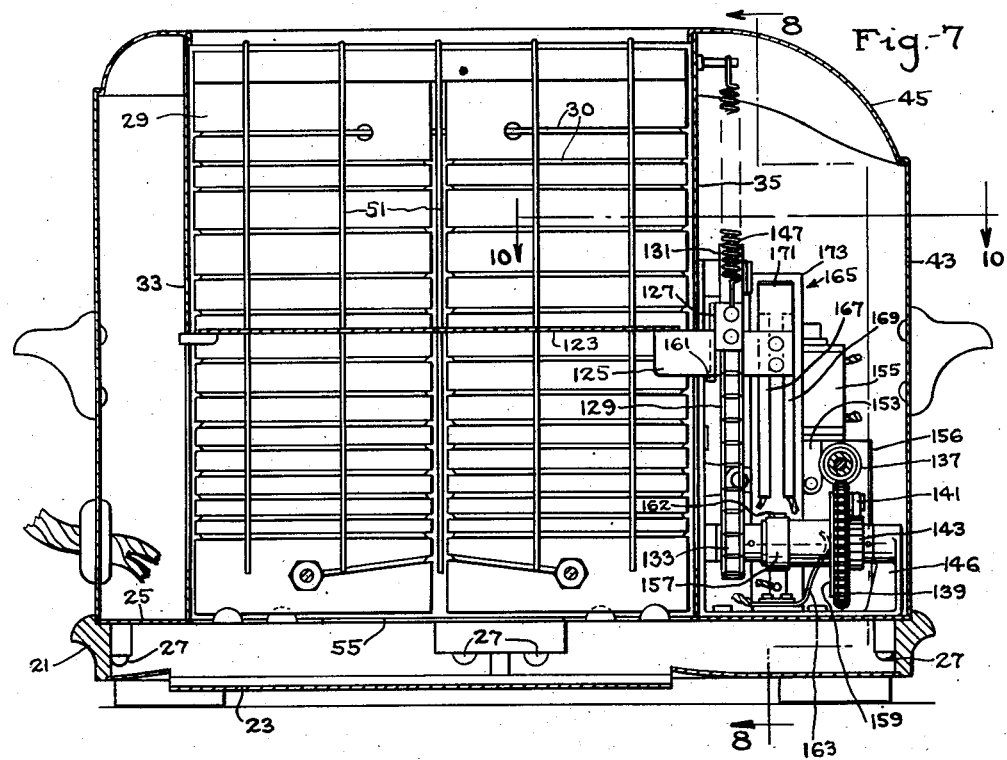
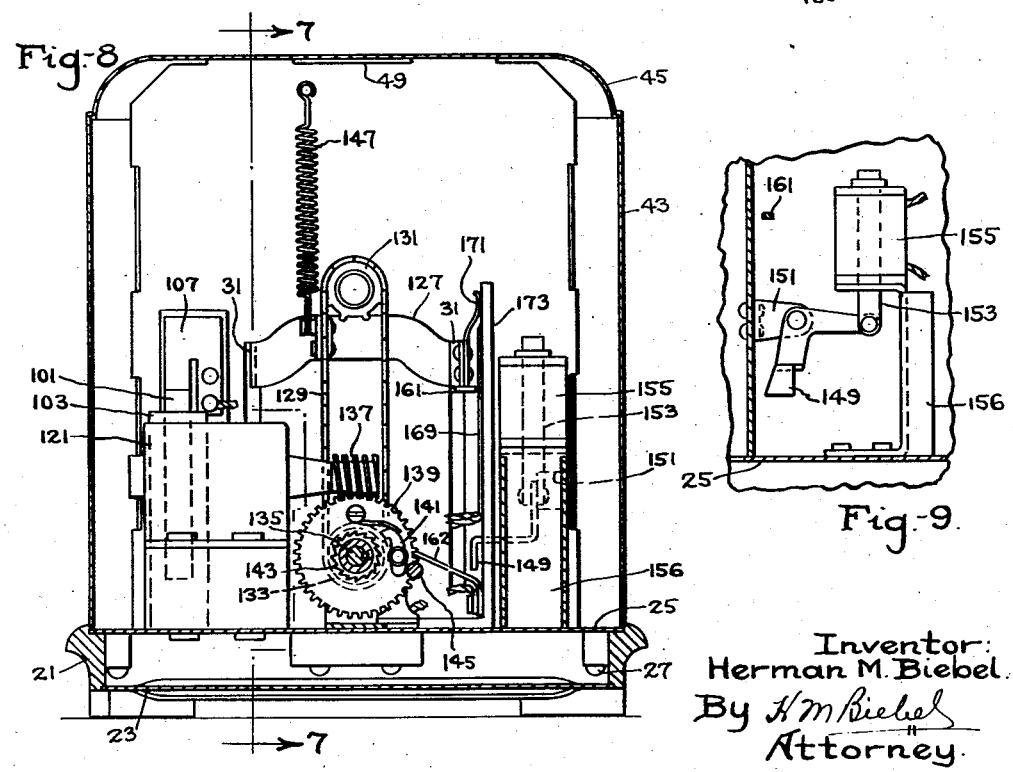

Dec. 16, 1941.         H. M. BIEBEL                2,266,301
                      AUTOMATIC TOASTER
              Filed June 29, 1938         4 Sheets-Sheet 4

Inventor:
Herman M. Biebel.
By H M Biebel
Attorney.

Patented Dec. 16, 1941

2,266,301

UNITED STATES PATENT OFFICE 2,266,301

AUTOMATIC TOASTER

Herman M. Biebel, Elgin, Ill., assignor to McGraw Electric Company, Chicago, Ill., a corporation of Delaware Application June 29, 1938, Serial No. 216,491

25 Claims. (Cl. 219—19)

My invention relates to electric cooking appliances and particularly to intermittently operated fully automatic electric toasters.

An object of my invention is to provide an automatic toaster having electromagnetic motor means for initiating a toasting operation and automatic means for terminating a toasting operation.

Another object of my invention is to provide a fully automatic electric toaster the operation of which is initiated by a push button control circuit.

Another object of my invention is to provide a fully automatic electric toaster in which the control switch is closed and the bread slice support moved to toasting position by electromagnetic motor means energizable by push button circuit means.

Another object of my invention is to provide a fully automatic electric toaster having push button controlled electromagnetic motor means for initiating a toasting operation, and automatic thermal timing means for terminating a toasting operation.

Still another object of my invention is to provide an automatic intermittently operable electric toaster having electromagnetic motor means for initiating a toasting operation and timing means for terminating a toasting operation, the operation of both said means being initiated at the beginning of a toasting operation by a push button control circuit.

Still another object of my invention is to provide a fully automatic electric toaster requiring only the location of a slice of bread on a movable support and a momentary pressure on a switch for initiating and completing a toasting operation.

Other objects of my invention will either be apparent from a description of several forms of device embodying my invention or will be hereinafter pointed out in the course of such description and set forth in the appended claims.

I am well aware that electromagnetic motor means of one kind or another have been used in electric toasters, but so far as I known such patents or devices do not disclose the particular combination of details constituting my invention as shown in the drawings and as set forth in the description thereof to be given hereinafter.

Figure 2:
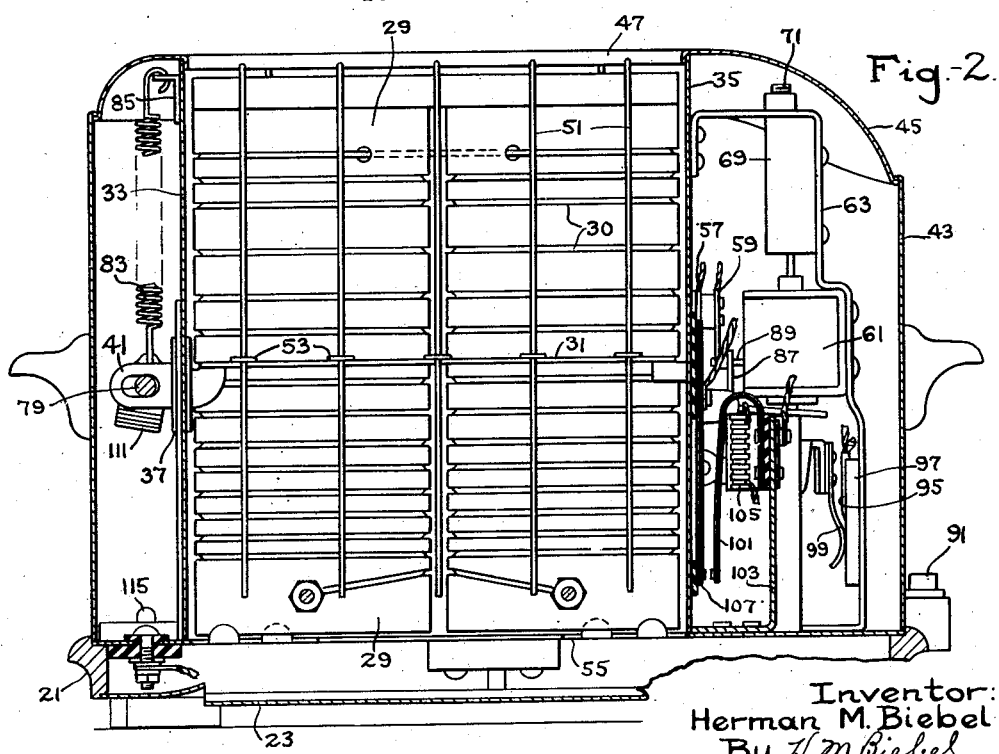

In the drawings,

Fig. 1 is a central vertical section through a toaster embodying my invention, taken on the line 1—1 of Fig. 3, the parts being shown in non-toasting positions, Fig. 2 is a vertical longitudinal section therethrough taken on the line 2—2 of Fig. 3, the parts being shown in non-toasting position.

Figure 10:
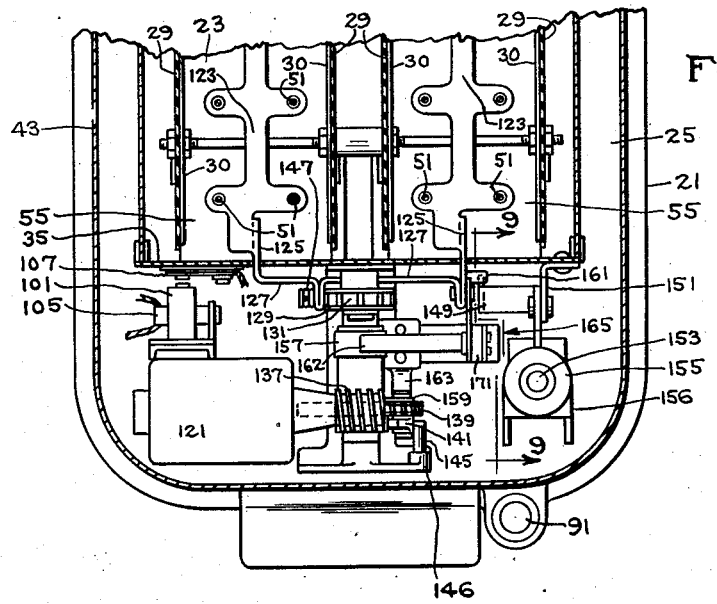
Figure 11:
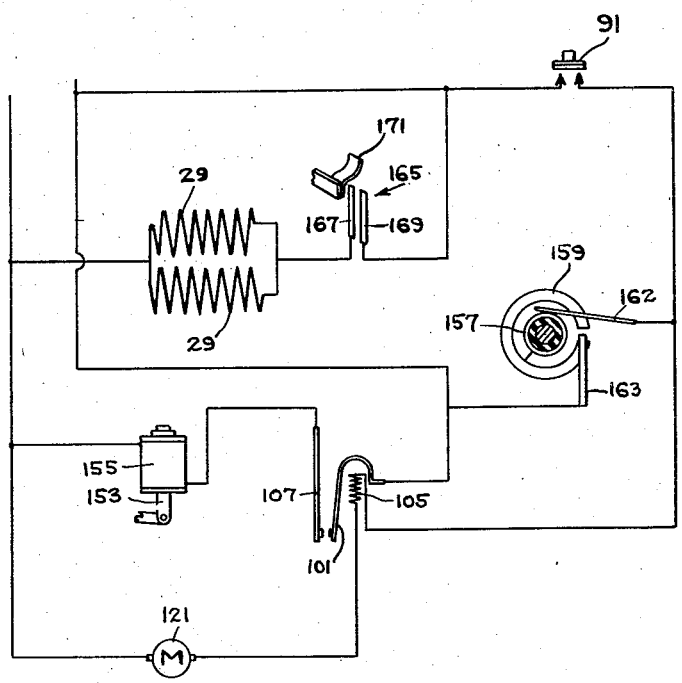

Fig. 3 is a horizontal sectional plan view therethrough taken on the line 3—3 of Fig. 1, Fig. 4 is a detail perspective view showing the stationary parts of an electric switch controlling the holding circuit, Fig. 5 is a fragmentary rear vertical sectional view on the line 5—5 of Fig. 3 showing certain of the parts in toasting position, Fig. 6 is a wiring diagram of the toaster shown in Figs. 1 to 5 inclusive, Fig. 7 is a vertical sectional view taken on the line 7—7 of Fig. 8 showing a modified form of fully automatic toaster showing the parts in non-toasting positions, Fig. 8 is a front elevational view, partially in section, taken on the line 8—8 of Fig. 7 and showing the parts in non-toasting position, Fig. 9 is a fragmentary vertical sectional view taken on the line 9—9 of Fig. 10, showing a bell-crank detent in combination with a solenoid, which locks the bread slice support in toasting position and then releases it to non-toasting position, Fig. 10 is a fragmentary horizontal sectional plan view taken on the line 10—10 of Fig. 7, and, Fig. 11 is a wiring diagram used in the toaster structure shown in Figs. 7, 8, 9 and 10.

Referring first to Figs. 1 to 6 inclusive I have there shown a fully automatic electric oven-type toaster including a base 21 of skeleton form and which may preferably be made of a molded composition material having associated therewith a removable crumb tray 23. A bottom plate 25 which may preferably be made of metal is secured in any suitable or desired way against the upper recessed surface of member 21 and as shown this is accomplished by the use of a plurality of screws 27.

Two pairs of electric heating elements 29 including a resistor 30 extend above the base plate 25 in a substantially vertical direction and are spaced apart from each other a distance sufficient to permit of locating between each pair of planar heating elements a slice of bread. While I have shown a toaster designed to receive two slices of bread and toast them simultaneously, I do not wish to be limited thereto as any other desired number of slices of bread may be toasted at the same time or only one slice may be toasted at one time. Each slice of bread is supported on a vertically movable bread slice support 31.

The bread slice supports are adapted to move vertically within a toasting chamber constituted in part by the outermost electric heating elements and a rear intermediate wall 33 and a front intermediate wall 35. Means for maintaining a substantially horizontal position of the respective bread slice supports 31 may include slides 37 secured to the bread supports and movable in a vertical slot 39 in rear wall 33. It may be noted that each bread slice support 31 has a portion 41 extending through the slot 39 which portion is secured to the slides 37, which, as shown particularly in Fig. 3 of the drawings, may be of channel shape in lateral section. This will maintain the bread slice supports in substantially horizontal position and permit of means to be hereinbefore described to cause movement of the bread slice supports to their upper position shown particularly in Fig. 2 of the drawings, which is the non-toasting position, and to a lower position shown more particularly in Fig. 5 of the drawings, which is the toasting position.

The toaster assembly includes further an outer casing 43 having a cover member 45 associated therewith which cover member is provided with a plurality of longitudinally extending slots 47 to permit of inserting and removing a slice of bread between each of the pairs of vertical heating elements 29. A top frame plate 49 (see Fig. 1) may be provided to hold the upper edges of the front and rear intermediate walls 33 and 35 in proper spaced-apart positions and may also support guard wires 51 in a manner now well known in the art. These guard wires may extend through lateral projections 53 on supports 31, which projections are perforated to receive the guard wires.

The bottom plate 25 may be provided with openings 55 therein, which openings are the counterpart of openings 47 in the cover to permit a through draft of cooling air to flow through the toasting chamber. While no specific means is shown for holding the upper edges of the respective heating elements in proper operative position these means are old and well known in the art and reference may be had to Ireland Pat. No. 2,001,362 for such details. It is to be understood that the details of construction of a toaster assembly thus far enumerated constitute no part of my invention but are already old and well known in the art and further while I have illustrated and described such specific details, my invention is not limited thereto but is applicable to substantially any form of intermittently operable toaster as well as to other cooking appliances where food is subjected to a heat treatment similar to that experienced by bread when being toasted. I desire it therefore to be understood that where, in the appended claims, a toasting operation is recited, it is to be construed broadly enough to cover any type of heat treatment of food in a manner similar to that effected by a toasting operation.

A normally open control switch for the electric heating units 29 may include a substantially fixed contact 57 and a movable contact arm 59 shown particularly in Figs. 1 and 2 of the drawings which contacts are insulatedly mounted on front intermediate wall 35 and are also suitably electrically insulated from one another, contact arm 59 being so designed and constructed that the switch is normally open.

Means for closing said switch includes an electromagnet 61 which may be supported between the front wall of casing 43 and front intermediate wall 35 as by a bracket 63 the end of which may be secured to bottom plate 25 and the upper end of which may be secured to the upper end of wall 35. A magnetizable core 65 is adapted to move vertically in electromagnet 61 and has secured thereto a piston 67 movable in an air cylinder 69 which latter is suitably secured to bracket 63. The cylinder 69 is provided with an adjustable air outlet including an adjustable needlepoint 71 to thereby vary the rate of movement of piston 67 when being forced upwardly by energized core 65 in the operation of the device.

At its lower end core member 65 is provided with a depending bracket 73 which is mechanically connected to a lever arm 75 pivotally mounted intermediate its ends at 77 on bracket 63, which has a portion extending upwardly for this purpose close to the front surface of wall 35. The rear end of lever arm 75 extends through a vertical slot 78 in the rear intermediate wall 33 and is adapted to receive a horizontal rod 79 extending through an elongated slot in rearward extensions 41 of bread slice supports 31 so that downward movement of the rear end of lever 75 will result in downward movement of bread slice supports 31. A coil spring 83 has its lower end secured to the rear end of lever arm 75 and its upper end secured to a bracket 85 to bias the rear end of lever arm 75 and the bread slice supports into an upper position where the bread slice supports will be in non-toasting positions.

Means for moving the contact arm 59 into engagement with fixed contact 57, may include a pivotally mounted second armature 87, of substantially L-shape, having one part of plate shape located in substantially horizontal position below the solenoid 61 and an upwardly extending portion provided with a lug 89 of electric-insulating material adapted to be used as a stop against the solenoid 61 and to engage the contact arm 59 to move it into engagement with contact 57. When solenoid 61 is energized the lower portion of armature 87 will move upwardly and cause a counterclockwise turning movement of the upper or substantially vertical extending portion of member 87 (as seen in Fig. 1) resulting in engagement of the two contact arms 57 and 59 and consequent energization of the main heating elements 29. A push button switch 91 biased to open position may be mounted in any suitable or desired location such as at the front of the casing on and immediately above the skeleton frame 21 which push button switch is effective to momentarily energize solenoid 61 to not only close the main heating element control switch but also to cause movement of the bread slice supports from non-toasting into toasting position. Continued energization of the solenoid is necessary to maintain these parts in their operative positions.

Continuance of the energization of solenoid 61 is effected by a holding circuit and contacts sliding on fixed and extended contact members including two metallic contact bars 93 and 95 (see Fig. 4) which are partially embedded in a block 97 of electric insulating material supported on the inside of bracket 63 in any suitable or desired manner. Bracket 73 carried by core member 65 has insulatedly mounted thereon and movable therewith a spring contact member 99 adapted to engage and electrically connect the two bars 93 and 95. The design and construction of bars 93 and 95 and contact bridging member 99 is such that normally member 99 is out of engagement with said contact bars 93 and 95, this position being shown in Figs. 1 and 2 of the drawings, but on momentary energization of solenoid 61 the core is quickly moved upwardly and bridging member 99 will engage bars 93 and 95 to close a holding circuit so that energization of the solenoid 61 is continued until interrupted by other means now to be described.

It is obvious that coil spring 83 biases the bread slice support to upper position and that the main control switch is also biased to open position because of the weight of the substantially horizontally extending part of pivotally mounted auxiliary armature 87.

It is desired that downward movement of the bread slices be effected relatively slowly for a purpose which will presently appear and this is accomplished by the use of the piston 67 moving in the air cylinder 69. Adjustment of the valve 71 will effect a variation in the speed of movement of the parts operatively connected therewith.

Means for causing termination of a toasting operation includes a main bimetal element 101 which may be suitably and preferably insulatedly supported on a bracket 103 at one side of the solenoid structure hereinbefore described and it may be noted that bimetal element 101 may be of substantially U-shape although this is not essential. However, if it is made of this shape there is provided a place for an auxiliary electric heating element 105 which may be of any suitable or desired kind and includes a partially bare resistor wire whereby heat generated therein by passage of current therethrough will quickly thermally affect bimetal element 101 and cause its lower end to flex in a counterclockwise direction.

A second bimetal element 107 may be insulatedly mounted on front intermediate wall 35 and be subjected either to radiant heat through an aperture in front intermediate wall 35 or may be subjected only to radiant heat from front intermediate wall 35 as may be found necessary or desirable. Bimetal element 107 is designed and constructed to move or to flex in a counterclockwise direction when heated.

Referring now to Fig. 6 of the drawings I have there illustrated a diagram of the connection of the various parts and electrical circuits relating to the elements hereinbefore described from which it will be noted that auxiliary heating element 105 is connected in series circuit relation with coil 61 and with a current limiting resistor 109. It will further be apparent that bimetal elements 101 and 107 are so electrically connected in circuit that when they engage they will short-circuit coil 61 thereby deenergizing it and causing opening of the main control switch and upward movement of the bread supports into non-toasting position by action of biasing spring 83.

The rear end of lever arm 75 has insulated mounted thereon a contact bridging member 111 which member is adapted to engage two resiliently supported contact pins 113 and 115 which are insulatedly supported by the bottom plate 25 of the toaster structure. These respective contact pins are electrically connected to the terminals of auxiliary heating element 105 so that energization of this auxiliary heating element, thermally affecting bimetal element 101, will continue only for the length of time required for the slow downward movement of bread slice supports 31 or until the bridging member 111 on the rear of arm 75 engages pins 113 and 115 when bread slice supports 31 are in the toasting position, to thereby deenergize auxiliary heating element 105, resulting in cooling of bimetal element 101.

As has been set forth hereinbefore bimetal element 101 flexes in a counterclockwise direction when heated and will therefore flex in a clockwise direction when cooled. The movement of the main bimetal element 101 is relatively sluggish as compared to the movement of bimetal element 107 both by design and location, and it has been found that it is best to so design and construct these two bimetal elements and the heating element for the main bimetal element, that these two bimetal elements are not normally in engagement at the beginning of a toasting operation starting either with the toaster structure at room temperature or at some higher temperature because of a number of immediately successive toasting operations. The mass of the auxiliary bimetal element may be made such that it responds quickly to changes in temperature, which helps in obtaining the above described operation.

Effective cooling of both bimetals may be caused by providing base plate 25 with one or more openings 117 (see Fig. 3) and by providing intermediate wall 35 with one or more openings 119 to thereby cause a through draft of cooling air to flow through base plate 25, through front intermediate wall 35, through at least a portion of the toasting chamber and out through one or both openings 47 in the cover.

The following is a brief description of the operation of the device shown in Figs. 1 to 5 of the drawings. Momentary closure by an operator of the normally open switch 91 causes energization of the solenoid 61, turning movement of armature 87 with resultant closure of the control switch for the main heating elements 29. Core 65 is energized and caused to move upwardly, member 99 cooperating with contact bars 93 and 95 to close and to maintain a holding circuit for solenoid 61. The slow escape of air in cylinder 69 through needle valve 71 causes a relatively slow upward movement of core 65 and a relatively slow downward movement of the bread slice supports and of the contact bridging member 111. Since auxiliary heating element 105 is connected in series circuit with solenoid 61, it will be energized simultaneously with solenoid 61 and its energization will continue until bridging member 111 engages contact pins 113 and 115. Main bimetal element 101 flexes in a counterclockwise direction when heated and flexes in a clockwise direction on cooling after deenergization of the auxiliary heater 105.

Auxiliary bimetal element 107 flexes in a counterclockwise direction as a result of increase of temperature by reason of heat from the toasting chamber and after a time interval the main and the auxiliary bimetal members will engage each other and thereby short-circuit solenoid 61 to terminate the toasting operation by opening of the control switch for the main heaters and upward movement of the bread slice support into non-toasting position. As has already been stated, it is possible to so design, construct and locate the different parts of the terminating means that the desired sequence of operation of the different parts will be as described, irrespective of the frequency of operation of the toaster or the length of the time interval between successive operations and irrespective of variations in the voltage of the supply circuit. Two elements which contribute to the successful operation are the use of a relatively high temperature of the main bimetal element and effective cooling of the bimetal elements and of the toaster chamber in the interval between successive toasting operations.

Referring now to Figs. 7 to 11 of the drawings I have there illustrated a modified form of electromagnetic motor, shown as a relatively small electric motor 121 which is mounted on a suitable support in front of the intermediate front wall 35. Wherever substantially the same elements are used in the structure shown in Figs. 7 to 11 inclusive, the details or elements are provided with the same numerals as were used in the structure shown in Figs. 1 to 5 inclusive.

Bread slice supports 123 are vertically movable between spaced pairs of electric heating elements but in this case they are individually provided with forwardly projecting extensions 125 secured to a cross bar 127 (see Fig. 8) which cross bar is mechanically connected to an endless chain 129 traveling over an upper rotatably mounted sprocket wheel 131 supported by front intermediate wall 35 and a lower rotatably mounted sprocket wheel 133 (see Fig. 10). Sprocket wheel 133 is mounted on a horizontally extending shaft 135 driven by a worm 137 on the shaft of motor 121. Worm 137 engages a worm gear 139 loose on shaft 135, and has mounted thereon a pawl 141 adapted to engage the teeth of a ratchet wheel 143 fixed on shaft 135, until pawl 141 engages a pin 145 fixedly supported on a bracket 146 (see Fig. 10), whereby engagement between the operating end of pawl 141 and ratchet 143 is interrupted as shown in Fig. 8 of the drawings. A coil spring 147 is connected to cross bar 127 to maintain it and the bread slice supports connected therewith in their upper positions where the bread slice supports will be in non-toasting position.

Means for holding the bread slice supports and the cross bar 127 in their lowered position includes a detent 149 pivotally mounted as on a bracket 151, the detent 149 being of bellcrank shape and having the other end thereof connected to the core 153 of a solenoid 155. The solenoid may be supported by a bracket 156 secured to bottom plate 25.

The motor driven parts include further an annular contact member 157 insulatedly mounted on shaft 135 and an incomplete flat annular contact member 159 insulatedly mounted on the inner face of worm gear 139. When the bread slice supports are in their lowered position, at which time pawl 141 is in the position shown in Fig. 8 of the drawings, a projection 161 on cross bar 127 has been moved under pivotally mounted detent 149 and the bread slice supports are therefore held in their toasting positions until released by means to be described hereinafter. At the time when pawl 141 is in the position shown in Fig. 8 of the drawings and the bread slice supports and cross bar 127 are in their lowered positions a spring contact bar 162 engaging continuous ring 157 and a spring contact bar 163 engaging the incomplete annulus 159 will have the positions shown in Fig. 11 of the drawings, that is the motor circuit and the circuit through an auxiliary heating element 105 of the same kind as was described hereinbefore, will be open and both the motor and the auxiliary heating element will be deenergized.

A main bimetal element 101 and an auxiliary bimetal element 107 as have already been described in connection with Figs. 1 to 6 of the drawings are provided and are located in substantially the same positions as were the similar parts in Figs. 1 to 5 inclusive.

A main control switch 165 is of a slightly different type and construction than that shown in Figs. 1 to 6 of the drawings and includes a pair of fixedly supported vertical contact bars 167 and 169 and a contact bridging member 171 which latter is carried at one end of cross bar 127 and suitably insulated therefrom. Contact bars 167 and 169 are insulatedly supported by or on a bracket 173 which may be supported on base plate 25.

Reference to Fig. 11 of the drawings will show that push button control switch 91 will initially energize the electric motor and the auxiliary heating element 105 simultaneously and at the very beginning of a toasting operation. Contact rings 157 and 159 move substantially simultaneously with the energization of motor 121 whereby these rings and contact bars 161 and 163 will close a holding circuit effective to maintain energization of the motor and of the auxiliary heating element until the holding circuit is broken by disengagement of contact bar 163 from incomplete ring 159. This of course happens at the instant that pawl 141 has been disengaged from ratchet wheel 143 and the bread slice supports are in their lowermost or toasting position.

Main bimetal element 101, when heated, moves in a counterclockwise direction and compensating bimetal element 107 moves in a counterclockwise direction when heated but as has already been set forth hereinbefore, it has been found possible to so design and construct these two elements that they will normally be out of engagement with each other at the beginning of a toasting operation irrespective of whether a toasting operation starts with a cold toaster structure or whether it starts with a toaster structure which has been heated up because of repeated cyclic operations.

The design and construction, particularly of the main bimetal element 101 is such, in addition to meeting the other conditions already discussed, that a relatively small part only of a toasting operation is required to heat it to a relatively high temperature where it will operate in the desired manner. The time of movement of the bread slice supports from toasting into non-toasting position in either of the two modifications shown, is made such that the desired heating effect of the auxiliary heating element 105 on main bimetal element 101 is obtained and I have found it possible to modify the winding of the wire or strip resistor on the electric insulating supports to still obtain uniform toasting of a slice of bread even though the same be moved downwardly on a relatively slow rate instead of the relatively high rate of speed hereinbefore provided by manually-actuable means.

It will be noted by reference to Fig. 11 that the main and the auxiliary bimetal elements control the energization of electromagnetic latch release means and particularly of solenoid 155 thereof by closing a circuit through the solenoid.

To start a toasting operation, bread slices are placed on the supports 123, which are normally in their upper positions, as shown in Fig. 7, and push button switch 91 is then closed momentarily. This energizes motor 121 and auxiliary heating element 105. The energized motor causes turning movement of worm gear 139, pawl 141, ratchet 143, shaft 135 and contact rings 157 and 159. Engagement between contact bar 163 and ring 159 closes a holding circuit so that energization of motor 121 and of the auxiliary heating element is continued after release of push button 91. Bridging member 171 is moved into engagement with bars 167 and 169 to energize the main heaters 29. At the same time the bread slice supports are being lowered into toasting position and when they have reached this position, the outer end of pawl 141 will engage pin 145 and be disengaged from ratchet 143. The design and adjustment of the various parts of the motor driven assembly is such that when pawl 141 is disengaged from ratchet 143, projection 161 is below detent 149 and contact bar 163 is out of engagement with ring 159, that is, the end of bar 163 is in the small gap between the ends of incomplete ring 159. The circuit through the motor and the auxiliary heating element is therefore opened, further rotation of the motor is prevented and the main bimetal element begins to cool off. There may be a slight upward movement of the bread slice supports and of the cross bar, but this limited movement is checked by detent 149 engaging projection 161, so that the bread slice supports are held in toasting position.

When engagement of the main and the auxiliary bimetal elements occurs, on sufficient cooling of the main bimetal element, the solenoid 155 is energized to cause a releasing movement of detent 149 from projection 161 and upward movement of the bread slice supports by reason of coil spring 147, so that the toasted slices of bread can be removed by an operator. The toaster is now ready for another operation in the manner just described.

It is obvious that the temperature of auxiliary bimetal element 107 will vary substantially with the temperature of the toasting chamber or of the toaster structure so that the duration of a toasting operation will be shorter when the toaster is heated by reason of preceding operations, than when the toaster is started from a cold condition. It is possible to so correlate the design, construction, location and adjustment of the parts of the terminating means hereinbefore described and including particularly the two thermally-actuable elements and the auxiliary electric heater that substantially uniformly toasted slices of bread will be obtained irrespective of the temperature conditions of the toaster, the voltage of the supply circuit or other variable operating conditions.

The device embodying my invention thus provides a fully automatic intermittently operable toaster in which it is only necessary to place the desired number of slices of bread on the supports and then momentarily close a switch, preferably in the form of a push button, to initiate a toasting operation and to energize simultaneously not only the initiating means but also the terminating means.

My invention thus provides automatic electromagnetic motor means to initiate a toasting operation, requiring only a slight momentary pressure on a push button switch to close a start control circuit and start a toasting operation, which operation continues without further attention by the operator who need only remove the toasted slices of bread when they have been moved upwardly at the end of the toasting operation.

While I have illustrated and described specific forms of means for effecting deenergization of the auxiliary heating element, my invention, in its broadest aspect is not limited thereto and the main bimetal element may itself be used to effect deenergization of the auxiliary electric heating element in substantially the manner set forth in Ireland application Ser. No. 51,397 filed November 25, 1935 and assigned to the same assignee as in the present application. It is further within the scope of my invention to use a bimetal element effective to terminate a toasting operation when it has been heated to a predetermined temperature. I may also use any other kind of known means for terminating a toasting operation. So long as it is operative in the same manner as the particular terminating means herein set forth and is covered by the appended claims.

I claim as my invention:

1. An automatic toaster comprising a heating means energizable only during a toasting operation, electromagnetic motor means for initiating a toasting operation, a start control circuit including a switch biased to open position and requiring momentary closing only for energizing said electromagnetic motor means, toasting operation terminating means and means for causing the energization of the toasting operation terminating means to be initiated by said start control circuit and terminated by said motor means.

2. An automatic electric toaster comprising an electric heating element, a switch for controlling said heating element, electromagnetic motor means for causing closing of said switch, means including a push-button switch biased to open position and requiring momentary closing only for energizing said motor means, and a thermal timing means constructed and arranged to be heated and then cooled during a toasting operation, said thermal timing means being effective to cause opening of said switch when the thermal timing means has been cooled to a given temperature, and means for initiating the operation of said thermal timing means simultaneously with the energization of said heating element.

3. In an automatic electric toaster the combination with an electric heating element, a switch biased to open position for controlling said heating element, and a bread slice support movable into toasting and non-toasting position relatively to said heating element and biased to non-toasting position, of electromagnetic motor means for causing closing of the control switch and movement of the bread slice support into toasting position, a push button controlled circuit for energizing said electromagnetic motor means, and toasting operating terminating means, the energization of which is initiated by said push button controlled circuit.

4. An automatic toaster comprising heating means, a bread slice support biased to non-toasting position, means to cause movement of the bread slice support to toasting position, timing means for causing movement of the bread slice support to non-toasting position including a thermally-actuable element and an auxiliary heating element in heat transmitting relation to said thermally-actuable element, and a push button controlled circuit for effecting energization of said auxiliary heating element, and means controlled by said bread slice support for limiting the duration of energization of the auxiliary heating element to the duration of the movement of the bread slice support from non-toasting to toasting position.

5. An automatic toaster comprising main electric heating means, a control switch for the heating means biased to open position, a bread slice support biased to non-toasting position relatively to said main heating means and movable to toasting position relatively to said main heating means, means for causing closing of said switch and movement of said bread slice support to toasting position and for holding said switch closed and said bread supoprt in toasting position, a timing means for causing opening of said switch and movement of said bread support to non-toasting position after a time interval, said timing means including a thermally-actuable member and an auxiliary heating element in heat transmitting relation to said thermally-actuable member, a push-button-controlled electric circuit for effecting energization of said auxiliary heating element and means operable by said bread slice support to effect deenergization of said auxiliary heating element when the bread slice support is moved into toasting position.

6. An automatic toaster comprising main electric heating means, a control switch therefor biased to open position, a bread slice support movable relatively to said main heating means into toasting and non-toasting positions and normally biased to non-toasting position, electromagnetic motor means for causing closing of said switch and movement of said bread support to toasting position and for holding said switch closed and said bread support in toasting position, a thermal timing means including a thermally-actuable element and an auxiliary heater in heat-transmitting relation to said thermally-actuable element for causing opening of said switch and movement of said bread slice support to non-toasting position, momentarily energizable switch means for causing energization of said electromagnetic motor means and of said auxiliary heater and means causing deenergization of said auxiliary heater when said bread slice support has been moved into toasting position.

7. A fully automatic intermittently operable toaster comprising heating means, automatic means for initiating a toasting operation including electromagnetic motor means and push-button-controlled circuit means for rendering said motor means operative, and automatic means for terminating a toasting operation after a time interval including timing means comprising a thermally-actuable element and electric heating means therefor, said electric heating means for the thermally-actuable element being energized by said push-button-controlled circuit means and deenergized by said electromagnetic motor means, termination of a toasting operation being effected when said thermally-actuable element has cooled to a predetermined temperature.

8. A fully automatic intermittently operable toaster comprising main heating means, automatic means for initiating a toasting operation including electromagnetic motor means and push-button-controlled circuit means for energizing said motor means, and automatic means for terminating a toasting operation after a time interval including timing means comprising a thermally-actuable element and an auxiliary electric heater therefor connected in series circuit relation with said electromagnetic motor means, means actuated by said electromagnetic motor means for deenergizing said auxiliary electric heater at the end of a fixed time interval, said terminating means becoming effective when said thermally actuable element has cooled to a predetermined temperature.

9. An automatic toaster comprising a main heating element, a bread slice support movable into toasting and non-toasting positions relatively to said main heating element and normally biased to non-toasting position, a normally deenergized electromagnet, operative connections between said electromagnet and said bread support whereby energization of said electromagnet causes movement of the bread support into and holds it in toasting position, a push button switch circuit for initiating energization of said electromagnet, a holding circuit controlled by the electromagnet for maintaining the energization thereof and means for effecting deenergization of said electromagnet after a time interval including a thermal timer comprising a thermally actuable member and an auxiliary heating element therefor, circuit connections for causing energization of said auxiliary heating element simultaneously with the energization of said electromagnet, means controlled by the electromagnet for causing deenergization of said auxiliary heating element when said bread support has moved into toasting position and means controllable by said thermally actuable member for causing deenergization of said electromagnet and termination of a toasting operation when said thermally actuable member has cooled to a predetermined temperature.

10. An automatic toaster comprising a main heating element, a control switch therefor biased to open position, a normally deenergized electromagnet controlling said switch, a push-button-controlled circuit for initiating the energization of said electromagnet to cause closing of said switch, a holding circuit controlled by said electromagnet for maintaining the energization thereof and means for effecting deenergization of said electromagnet, opening of the switch and termination of a toasting operation, said deenergizing means including a thermal timer comprising a thermally responsive member and an auxiliary heating element therefor, circuit connections for causing energization of the auxiliary heating element simultaneously with the energization of the electromagnet, means controlled by the electromagnet for causing deenergization of said auxiliary heating element a predetermined interval of time after energization thereof and means controlled by said thermally responsive member for causing deenergization of said electromagnet, opening of the switch and termination of a toasting operation when said thermally responsive member has cooled to a predetermined temperature.

11. An automatic toaster comprising a main heating element, a control switch therefor biased to open position, a normally deenergized electromagnet controlling said switch, a push-button-controlled circuit for initiating the energization of said electromagnet to cause closing of said switch, a holding circuit controlled by said electromagnet for maintaining the energization thereof and means for effecting deenergization of said electromagnet, opening of the switch and termination of a toasting operation, said deenergizing means including a thermal timer comprising a thermally responsive member and an auxiliary heating element therefor, circuit connections for causing energization of the auxiliary heating element simultaneously with the energization of the electromagnet, means controlled by the electromagnet for causing deenergization of said auxiliary heating element a predetermined interval of time after energization thereof and means including said thermally responsive member, a second thermally responsive member subject to toasting temperature and circuit connections between said thermally responsive members and said electromagnet for causing deenergization thereof when said first named thermally responsive member has cooled to a predetermined temperature.

12. An automatic toaster comprising a main heating element, a bread slice support movable into toasting and non-toasting positions relative to said main heating element and normally biased to non-toasting position, a normally deenergized electric motor, mechanical connections between said motor and said bread support for causing energization of said motor to effect movement of said bread support to toasting position, a push button circuit for initiating energization of said motor, a holding circuit controlled by the motor for maintaining the energization thereof for a predetermined time interval, a detent for holding said bread support in toasting position and a detent releasing means including a thermally-responsive timer comprising a thermally-actuable member and an auxiliary heating element therefor, means causing energization of said auxiliary heating element during only the time of energization of said motor and means for effecting release of said detent when said thermally-actuable member has cooled to a predetermined temperature.

13. An automatic toaster comprising a main heating element, a control switch therefor biased to open position, a normally deenergized electric motor, means for causing said motor when energized to close said switch, a push button circuit for initiating energization of said motor, a holding circuit controlled by the motor for maintaining the energization thereof for a predetermined time interval, a detent for holding said switch in closed position and means for causing release of said detent after a time interval including a thermal timer comprising a thermally actuable member and an auxiliary electric heating element therefor energized simultaneously with said motor and means controlled by said thermally actuable member on cooling thereof to cause release of said detent.

14. An intermittently operable automatic electric toaster comprising a main electric heating element, a control switch therefor biased to open position, a normally deenergized electric motor, means for causing said motor when energized to close said switch, a detent for holding said switch in closed position, a push button circuit for initiating energization of said motor, a holding circuit controlled by the motor for maintaining the energization of said motor for a predetermined time interval and then deenergizing the same, a normally deenergized electromagnet for tripping said detent and means for energizing said electromagnet after a time interval, said energizing means comprising a thermally-actuable member, an auxiliary electric heating element therefor connected in series circuit with said electric motor and electric circuit means for said electromagnet closable by said thermally-closable member when said member has cooled to a predetermined temperature.

15. A toaster as set forth in claim 14 in which said electric circuit means includes a second thermally-actuable member subject to toaster temperature.

16. A device as set forth in claim 7 in which said timing means includes an auxiliary thermal member subject to toaster temperature coacting with said thermally actuable element to vary the time interval of a toasting operation in accordance with the temperature of the toaster whereby substantially uniform toasting of successive slices of bread is effected irrespective of variation of toaster temperature.

17. In an automatic electric toaster the combination with an electric heating element, a control switch biased to open switch position for controlling said heating element, and a bread slice support movable into toasting and non-toasting position relatively to said heating element and biased to non-toasting position, of electromagnetic motor means for causing closing of the control switch and movement of the bread slice support into toasting position, means for initiating a toasting operation comprising a momentarily closed circuit energizing said electromagnetic motor means, and means for terminating said toasting operation, the energization of which is caused by said initiating means.

18. In an automatic electric toaster the combination with an electric heating element, and a bread slice support movable into toasting and non-toasting position relatively to said heating element and biased to non-toasting position, of electromagnetic motor means for causing movement of the bread slice support into toasting position, and means responsive to movement of said electromagnetic motor means for deenergizing the same upon movement of said bread slice support to toasting position.

19. In an automatic electric toaster the combination with an electric heating element, a control switch biased to open switch position for controlling said heating element, and a bread slice support movable into toasting and non-toasting position relatively to said heating element and biased to non-toasting position, of electromagnetic motor means for causing closing of the control switch and movement of the bread slice to toasting position, and means responsive to movement of said electromagnetic motor means for deenergizing the same upon movement of said bread slice support to toasting position.

20. In an automatic electric toaster the combination with an electric heating element of an electromagnetic motor means movable upon energization from a starting position to a second position, a bread slice support biased to non-toasting position relative to the heating element and movable from non-toasting to toasting position in response to movement of the electromagnetic motor means to its said second position, and means also responsive to movement of the electromagnetic motor means to its said second position for deenergizing the electromagnetic motor means.

21. In an automatic electric toaster the combination with an electric heating element of a reciprocable bread slice support movable into toasting and non-toasting position relative to said heating element and biased to non-toasting position of electromagnetic motor means for causing movement of the bread slice support to toasting position and closing of the heating element control switch, a control circuit for energizing the electromagnetic motor means, means for initiating a toasting operation comprising a momentarily closed switch in said circuit and a manually actuated element for closing said switch, means responsive to movement of the bread carrier to toasting position to close the heating element switch and deenergize the electromagnetic motor means, releasable means for preventing return of the bread slice support to non-toasting position, and timing means energized in response to operation of the initiating means for terminating the toasting operation, said timing means being operative to actuate said releasable means to effect return of the bread slice support to non-toasting position and opening of the heating element switch.

22. In an automatic electric toaster the combination with an electric heating element, a control switch biased to open switch position for controlling said heating element, and a bread slice support movable into toasting and non-toasting position relative to said heating element and biased to non-toasting position, of electromagnetic motor means for causing movement of the bread slice support into toasting position, means for initiating a toasting operation comprising a control circuit energizing the electromagnetic motor means, a momentarily closed first switch for closing said circuit to initiate operation of the electromagnetic motor means, a second switch responsive to operation of the initiating means to maintain the circuit closed independently of the opening of the momentarily closed first switch, means for closing the heating element switch responsive to actuation of the initiating means, and means for terminating the toasting operation, the energization of which is caused by the initiating means.

23. In an automatic electric toaster the combination with an electric heating element, a control switch biased to open switch position for controlling said heating element, and a bread slice support movable into toasting and non-toasting position relative to said heating element and biased to non-toasting position, of electromagnetic motor means for causing movement of the bread slice support into toasting position, a control circuit for energizing the electromagnetic motor means, timer means for terminating the toasting operation, means for initiating a toasting operation simultaneously operative to close the electromagnetic motor means circuit and energize the toasting operation timer means, and means for closing the heating element switch responsive to operation of said initiating means.

24. In an automatic electric toaster, the combination with an electric heating element, and a bread slice support movable into toasting and non-toasting position relative to said heating element, toasting operation initiating means for effecting movement of the bread slice support from non-toasting to toasting position, and further means for effecting movement of the bread slice support from toasting to non-toasting position, a thermal timer having an auxiliary heater controlling duration of the toasting operation and operation of said means for effecting movement of the bread slice support from toasting to non-toasting position, and means operative to energize the auxiliary heater of the timer upon actuation of the initiating means at the start of movement of the bread slice support from non-toasting position and rendered inoperative by movement of the bread slice support to toasting position to deenergize the auxiliary heater.

25. In an automatic electric toaster the combination with an electric heating element, a control switch biased to open switch position for controlling said heating element, and a bread slice support movable into toasting and non-toasting position relative to said heating element, of electromagnetic motor means for causing movement of the bread slice support into toasting position, means for initiating a toasting operation comprising a control circuit for energizing the electromagnetic motor means to move the bread slice support to toasting position, means for terminating the toasting operation controlling return of the bread slice support to non-toasting position, and damping means for effecting a slow motion movement of the bread slice support between its respective positions becoming operative substantially upon the initiation of movement of the support from one position to cause the support to move slowly until it reaches its other position.

HERMAN M. BIEBEL.